US011302029B2

(12) United States Patent
Arimatsu et al.

(10) Patent No.: US 11,302,029 B2
(45) Date of Patent: Apr. 12, 2022

(54) INFORMATION PROCESSING APPARATUS, INFORMATION PROCESSING SYSTEM, INFORMATION PROCESSING METHOD, AND PROGRAM

(71) Applicant: Sony Interactive Entertainment Inc., Tokyo (JP)

(72) Inventors: Kazuyuki Arimatsu, Tokyo (JP); Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 22 days.

(21) Appl. No.: 16/957,853

(22) PCT Filed: Jan. 19, 2018

(86) PCT No.: PCT/JP2018/001636
§ 371 (c)(1),
(2) Date: Jun. 25, 2020

(87) PCT Pub. No.: WO2019/142329
PCT Pub. Date: Jul. 25, 2019

(65) Prior Publication Data
US 2020/0327693 A1  Oct. 15, 2020

(51) Int. Cl.
*G06T 7/73* (2017.01)

(52) U.S. Cl.
CPC ...... *G06T 7/73* (2017.01); *G06T 2207/10028* (2013.01); *G06T 2207/20081* (2013.01);
(Continued)

(58) Field of Classification Search
CPC ............. G06T 7/73; G06T 2207/10028; G06T 2207/20081; G06T 2207/30196;
(Continued)

(56) References Cited

U.S. PATENT DOCUMENTS

| 10,359,837 B2 | 7/2019 | Yoshikawa |
| 2018/0067546 A1 | 3/2018 | Yoshikawa |

(Continued)

FOREIGN PATENT DOCUMENTS

| JP | 04156610 A | 5/1992 |
| JP | 2012155669 A | 8/2012 |
| WO | 2016157938 A1 | 10/2016 |

OTHER PUBLICATIONS

International Search Report for corresponding PCT Application No. PCT/JP2018/001636, 2 pages, dated Feb. 27, 2018.
(Continued)

*Primary Examiner* — Jerome Grant, II
(74) *Attorney, Agent, or Firm* — Matthew B. Dernier, Esq.

(57) ABSTRACT

An information processing apparatus is connected to a first information acquisition apparatus that acquires first information relating to at least one of a position or a pose of a hand of a target person and a second information acquisition apparatus that acquires second information relating to at least one of the position or the pose of the hand of the target person and different from the first information acquired by the first information acquisition apparatus. The information processing apparatus accepts the first information and the second information from the first and second information acquisition apparatuses, respectively, retains the accepted first and second information in an associated relationship with information of timings at which the first and second information acquisition apparatuses acquire the first and second information, respectively, and extracts pieces of the first and second information acquired at a common timing from the retained first and second information as pair information.

7 Claims, 5 Drawing Sheets

(52) U.S. Cl.
CPC .............. *G06T 2207/30196* (2013.01); *G06T 2207/30204* (2013.01)

(58) Field of Classification Search
CPC ............ G06T 2207/30204; G06N 3/08; G06K 9/6271; G06K 9/6264; G06K 2209/40; G06K 2009/3225; G06K 9/00355; G06F 3/01
USPC ........................................................ 382/106
See application file for complete search history.

(56) References Cited

U.S. PATENT DOCUMENTS

| | | | |
|---|---|---|---|
| 2019/0138107 A1* | 5/2019 | Nietfeld | G06T 19/006 |
| 2020/0327693 A1* | 10/2020 | Arimatsu | G06K 9/00355 |
| 2021/0046380 A1* | 2/2021 | Ohashi | A63F 13/218 |
| 2021/0118038 A1* | 4/2021 | Schmidt | G06T 7/62 |

OTHER PUBLICATIONS

International Preliminary Report on Patentability and Written Opinion for corresponding PCT Application No. PCT/JP2018/001636, 13 pages, dated Jul. 30, 2020.

* cited by examiner

F I G. 4
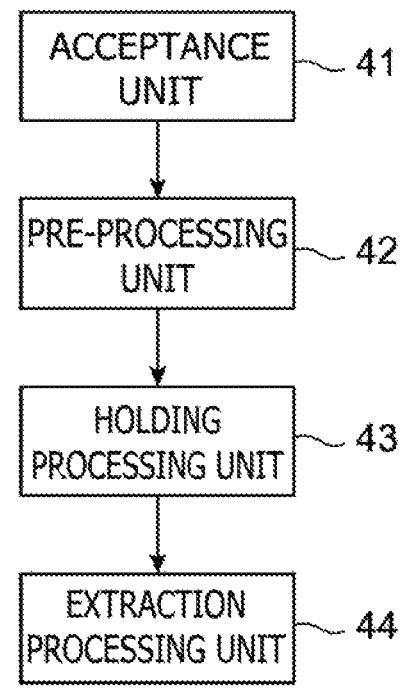

INFORMATION PROCESSING APPARATUS, INFORMATION PROCESSING SYSTEM, INFORMATION PROCESSING METHOD, AND PROGRAM

TECHNICAL FIELD

The present invention relates to an information processing apparatus, an information processing system, an information processing method, and a program.

BACKGROUND ART

In recent years, an information processing apparatus such as a consumer game machine that recognizes a position or a pose of a hand of a player and provides information of the recognized position or pose of the hand in processing of a game or the like has been and is being developed.

In such an information processing apparatus as just described, a device to be grasped by a hand of a player (hereinafter referred to as a controller device) measures, for example, a distance from the controller device itself to fingers of the player or the like. Then, the position or the pose of the hand of the player is estimated using the information of the measured distances between the controller device and the fingers, information of a posture or the like of the controller device itself and so forth.

In a different example, the information processing apparatus captures an image of a hand of a player by a camera or the like and estimates the position or the pose of the hand of the player on the basis of the captured image of the hand.

While various methods are available for an estimation process, for example, a method using a result of mechanical learning of artificial intelligence or the like is available as an example. In the case where a result of mechanical learning is used, for example, information of a position or a pose of a hand of a user that is a correct answer is measured and acquired by a device (hereinafter referred to as a measurement device for the convenience of description) other than a device such as the controller device or the camera (hereinafter referred to as a supposing device for the convenience of description). Then, a neural network is learned using the correct answer information as a teacher signal and using the information acquired by the controller device as an input signal, and then the neural network is used.

SUMMARY

Technical Problems

However, it is not necessarily easy to acquire correct answer information to be used as the teacher signal and find out information acquired by a controller device corresponding to the correct answer information.

For example, in the case where information of a position or a pose of a hand of a target person for measurement is acquired as correct answer information using the measurement device described above, it is necessary to find out, corresponding to a point of time at which the information is acquired, information acquired by the supposing device (an image of a camera, information of a distance between the controller device and the fingers or the like). However, according to a conventional method, the target person is urged to move its hand to a designated position and take a designated pose, information is acquired by the measurement device, and then the information acquired by the supposing device is recorded in an associated relationship at the point of time. Then, pieces of information that relate to one by one position and pose, are associated with each other and are to be acquired by the measurement device (teacher signal) and information acquired by the supposing device (input signal) are set by a manual work, and then a mechanical learning process is performed.

Therefore, the burden when data for mechanical learning (information that associates the teacher signal and the corresponding input signal with each other) is prepared is great.

The present invention has been made in view of such a situation as described above, and it is one of objects of the present invention to provide an information processing apparatus, an information processing system, an information processing method, and a program by which data for mechanical learning for estimating information of a position or a pose of a hand of a target person or the like can be generated efficiently.

Solution to Problems

One aspect of the present invention that solves the problems of the conventional examples described above is an information processing apparatus connected to a first information acquisition apparatus that acquires first information relating to at least one of a position or a pose of a hand of a target person and a second information acquisition apparatus that acquires second information relating to at least one of the position or the pose of the hand of the target person and different from the first information acquired by the first information acquisition apparatus, and including acceptance means for accepting the first information and the second information from the first and second information acquisition apparatuses, respectively, retention means for retaining the accepted first and second information in an associated relationship with information of timings at which the first and second information acquisition apparatuses acquire the first and second information, respectively, and extraction means for extracting pieces of the first and second information acquired at a common timing from the retained first and second information as pair information, and in which the extracted pair information is provided for a learning process of mechanical learning using the first and second information included in the pair information as a teacher signal and an input signal, respectively.

Advantageous Effects of Invention

With the present invention, data for mechanical learning for estimating information of a position or a pose of a hand of a target person can be produced efficiently.

BRIEF DESCRIPTION OF DRAWINGS

FIG. 4 is a functional block diagram depicting an example of an information processing apparatus according to the embodiment of the present invention.

DESCRIPTION OF EMBODIMENT

In the following, an embodiment of the present invention is described with reference to the drawings. As exemplified in FIG. 1, an information processing system 1 according to the embodiment of the present invention is configured by including a measurement device 10 as a first information acquisition apparatus, an estimation device 20 as a second information acquisition device and an information processing apparatus 30.

Figure 1:
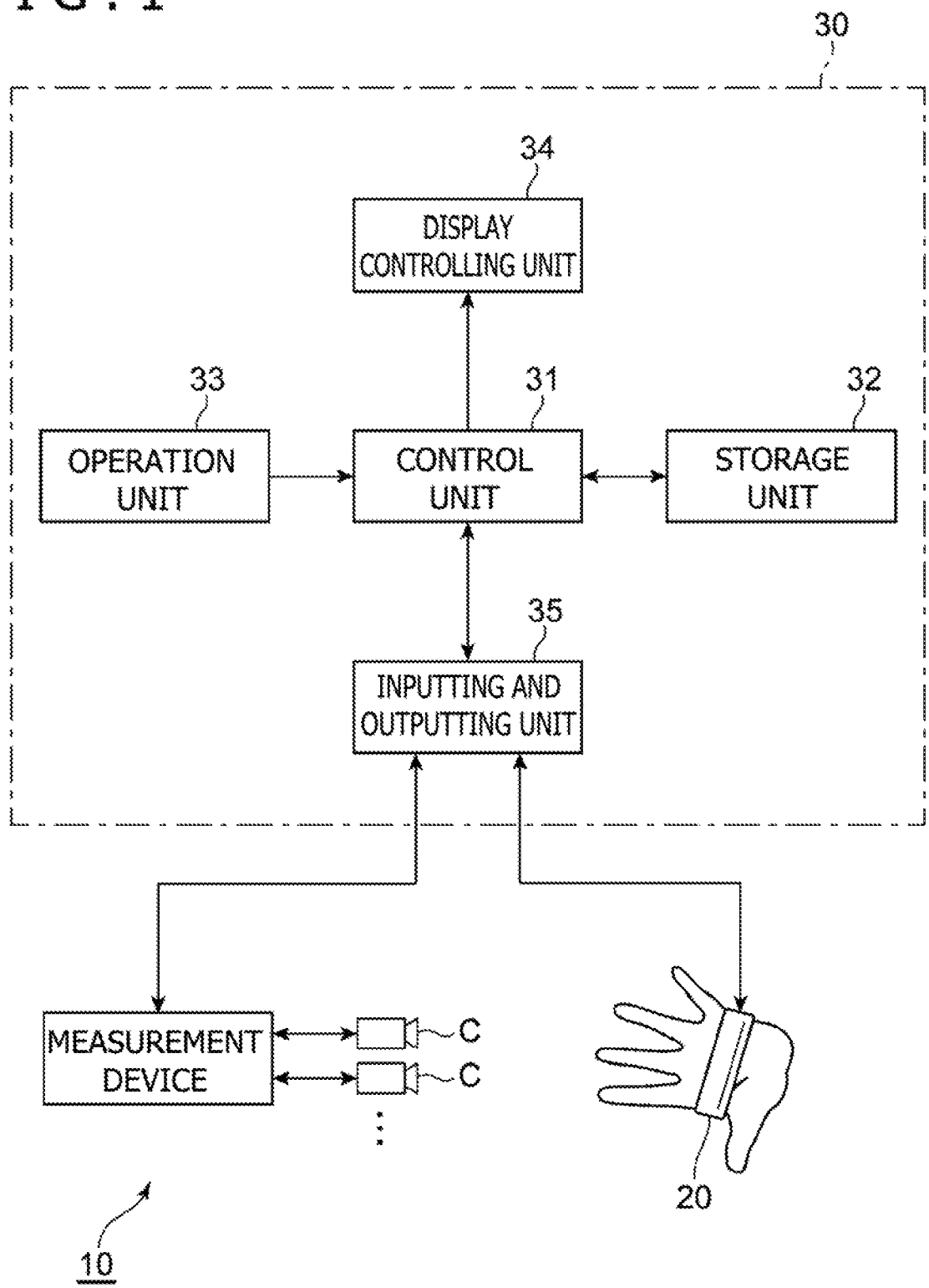
FIG. 1 is a block diagram depicting an example of a configuration of an information processing system according to an embodiment of the present invention.

Here, as depicted in FIG. 1, the information processing apparatus 30 is configured by including a control unit 31, a storage unit 32, an operation unit 33, a display controlling unit 34, and an inputting and outputting unit 35.

Figure 2:
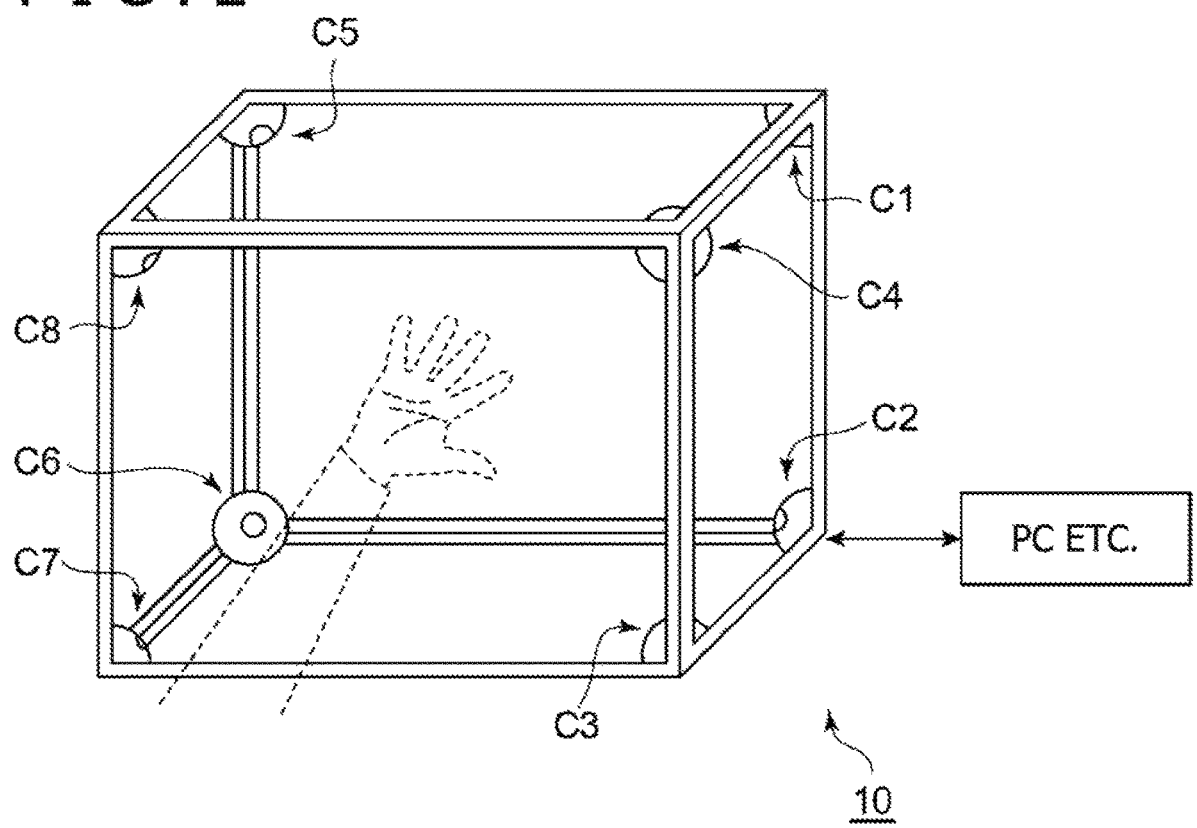
FIG. 2 is an overview explanatory view depicting an example of a measurement device used by the information processing system according to the embodiment of the present invention.

Further, as exemplified in FIG. 2, the measurement device 10 of one example of the present embodiment includes a large number of cameras C arranged around a hand of a target person who is a target of measurement, and can capture an image of the hand by a plurality of cameras C1, C2, . . . from among the cameras C at whichever position and whatever pose the hand of the target person takes. Further, the measurement device 10 includes an information processing device such as a PC (personal computer), and recognizes, from an image captured at every predetermined timing (for example, at every periodical timing such as every 1/60 second), the position of each of a plurality of markers, which are pasted to main positions of a hand (for example, at joint positions of the fingers or the like) of the target person, in a three-dimensional space. Then, the measurement device 10 outputs information of the recognized position (three-dimensional coordinate information) of each marker together with timestamp information representative of the point of time of imaging. Since such a device as just described can be implemented using a system known as a motion capture system such as OptiTrack (registered trademark) by SPICE INC., detailed description of the device is omitted here. Naturally, the measurement device may use any method that uses electromyography, ultrasonic waves or the like only if the measurement device can acquire at least one of a position or a pose of a hand of a target person without fail.

Figure 3:
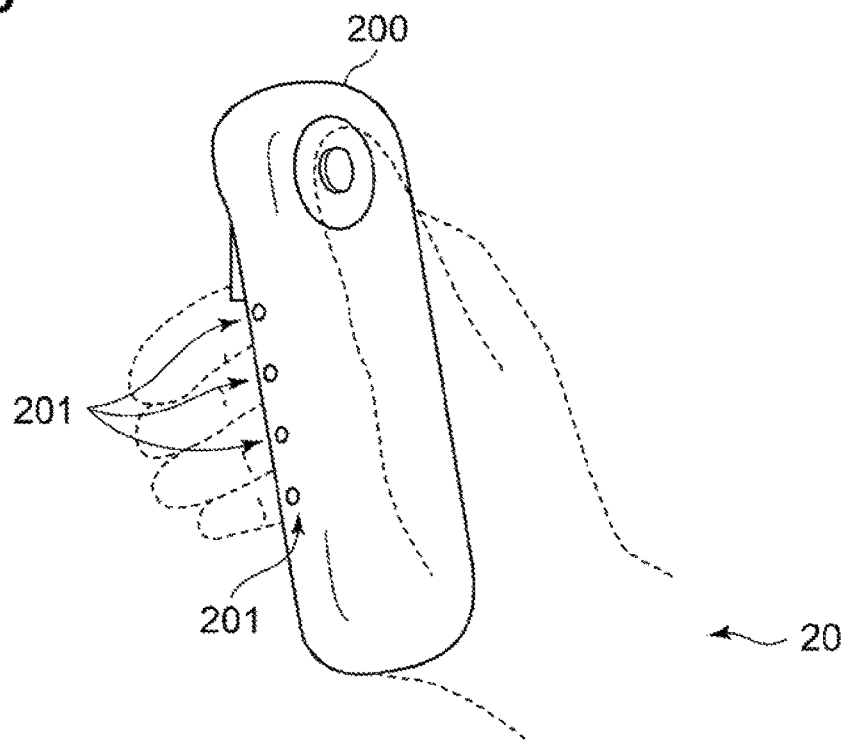
FIG. 3 is an outline explanatory view depicting an example of an estimation device used by the information processing system according to the embodiment of the present invention.

Further, the estimation device 20 according to one example of the present embodiment is a controller device 200 that is grasped by a hand of a target person, for example, as exemplified in FIG. 3. This controller device 200 has, in the example of FIG. 3, an elongated column-like shape and has, at positions thereof with which the fingers of the target person when the controller device 200 is grasped by the target person are to contact, sensors 201 for measuring the position to a fingertip such as capacitance sensors or infrared distance sensors.

It is to be noted that, in the examples of FIGS. 2 and 3, the hand of the target person is indicated by broken lines for the convenience of description.

In the example of the present embodiment, the controller device 200 repeatedly acquires information of the distance to a fingertip of the target person measured by each sensor 201 at every predetermined timing (for example, at every periodical timing after every 100 milliseconds or the like). Then, every time such information is acquired, the controller device 200 sends out the information to the information processing apparatus 30.

The control unit 31 of the information processing apparatus 30 is a program-controlled device such as a CPU (central processing unit) and operates in accordance with a program stored in the storage unit 32. The control unit 31 in the present embodiment accepts three-dimensional coordinate information representative of the positions of markers arranged at different portions of a hand of the target person and timestamp information representative of a point of time of capturing an image of the markers as first information from the measurement device 10 that is the first information acquisition apparatus. Further, the control unit 31 accepts information acquired by the estimation device 20 from the estimation device 20 as the second information acquisition apparatus. For example, if the estimation device 20 is the controller device 200, then the control unit 31 accepts information of the distance to the fingertips of the target person as second information from the controller device 200 at every predetermined timing (for example, at every periodical timing after every 100 milliseconds or the like).

The control unit 31 retains the accepted first and second information in an associated relationship with information of timings at which the first and second information is acquired by the measurement device 10 and the estimation device 20 that are the first and second information acquisition apparatuses, respectively. Further, the control unit 31 extracts pieces of the first and second information acquired at common timings from among the retained first and second information as pair information. Then, the extracted pair information is used in a learning process of mechanical learning in which the first information and the second information included in the pair information are used as a teacher signal and an input signal, respectively.

The storage unit 32 is a memory device, a disk device or a like device and retains a program to be executed by the control unit 31. This program is stored in and provided as a computer-readable non-transitory recording medium and may be stored in the storage unit 32. Further, the storage unit 32 operates also as a work memory of the control unit 31.

The operation unit 33 is connected to a device such as a keyboard or a mouse, and accepts an input of an instruction operation of a user from the device and outputs information representative of the content of the instruction operation to the control unit 31. The display controlling unit 34 is connected to a display or a like device and controls the display or the like device to display and output information in accordance with an instruction inputted from the control unit 31.

The inputting and outputting unit 35 is connected to the measurement device 10 and the estimation device 20 by wired communication by USB (universal serial bus) or the like or wireless communication by Bluetooth (registered trademark) communication, and accepts information outputted from the devices and outputs the information to the control unit 31. Further, the inputting and outputting unit 35 outputs information to a device connected thereto in accordance with an instruction inputted from the control unit 31.

Now, operation of the control unit 31 is described. The control unit 31 of the present embodiment is configured by functionally including an acceptance unit 41, a pre-processing unit 42, a holding processing unit 43 and an extraction processing unit 44 as exemplified in FIG. 4. It is to be noted that, in the example described below, it is assumed that the estimation device 20 connected to the information processing apparatus 30 is the controller device 200.

The acceptance unit 41 accepts first information from the measurement device 10 that is the first information acquisition apparatus through the inputting and outputting unit 35. Here, the first information includes three-dimensional coordinate information (P1, P2, . . . ) representative of positions, which are recognized on the basis of an image captured at every predetermined timing, of the markers arranged at portions of the hand of the target person and timestamp information (T) representative of a point of time at which an image of the markers is captured.

Further, the acceptance unit 41 accepts information (FP1, FP2, . . . ) of the distance between the controller device 200 and the fingertip of each finger of the target person at every predetermined timing (at a periodical timing such as every 100 milliseconds) as second information from the controller device 200 as the second information acquisition apparatus through the inputting and outputting unit 35.

The pre-processing unit 42 executes a pre-process for retaining first and second information accepted by the acceptance unit 41 by the holding processing unit 43. In a certain example of the present embodiment, the pre-processing unit 42 acquires, every time the pre-processing unit 42 accepts the second information from the controller device 200, information of a timing (time information) at which the second information is accepted. It is sufficient if the time information is acquired from a time counting circuit (RTC (real time clock) or a like circuit) not depicted or acquired from a time information server through a network or the like.

The pre-processing unit 42 subtracts reference time t0, which is defined by time information t acquired when second information is accepted for the first time after processing is started, from the time information t acquired at the time of the second information accepted for the i-th time to obtain timing information ti (i=1, 2, . . . ; accordingly, for the second information for the first time, t1=0). Then, the pre-processing unit 42 places the timing information ti into a corresponding piece of the second information and outputs the piece of the second information to the holding processing unit 43. Further, in the present example, the pre-processing unit 42 outputs the first information as it is to the holding processing unit 43.

The holding processing unit 43 accepts the first and second information (second information here includes the timing information) outputted from the pre-processing unit 42 and cumulatively stores the information into the storage unit 32.

Figure 5:
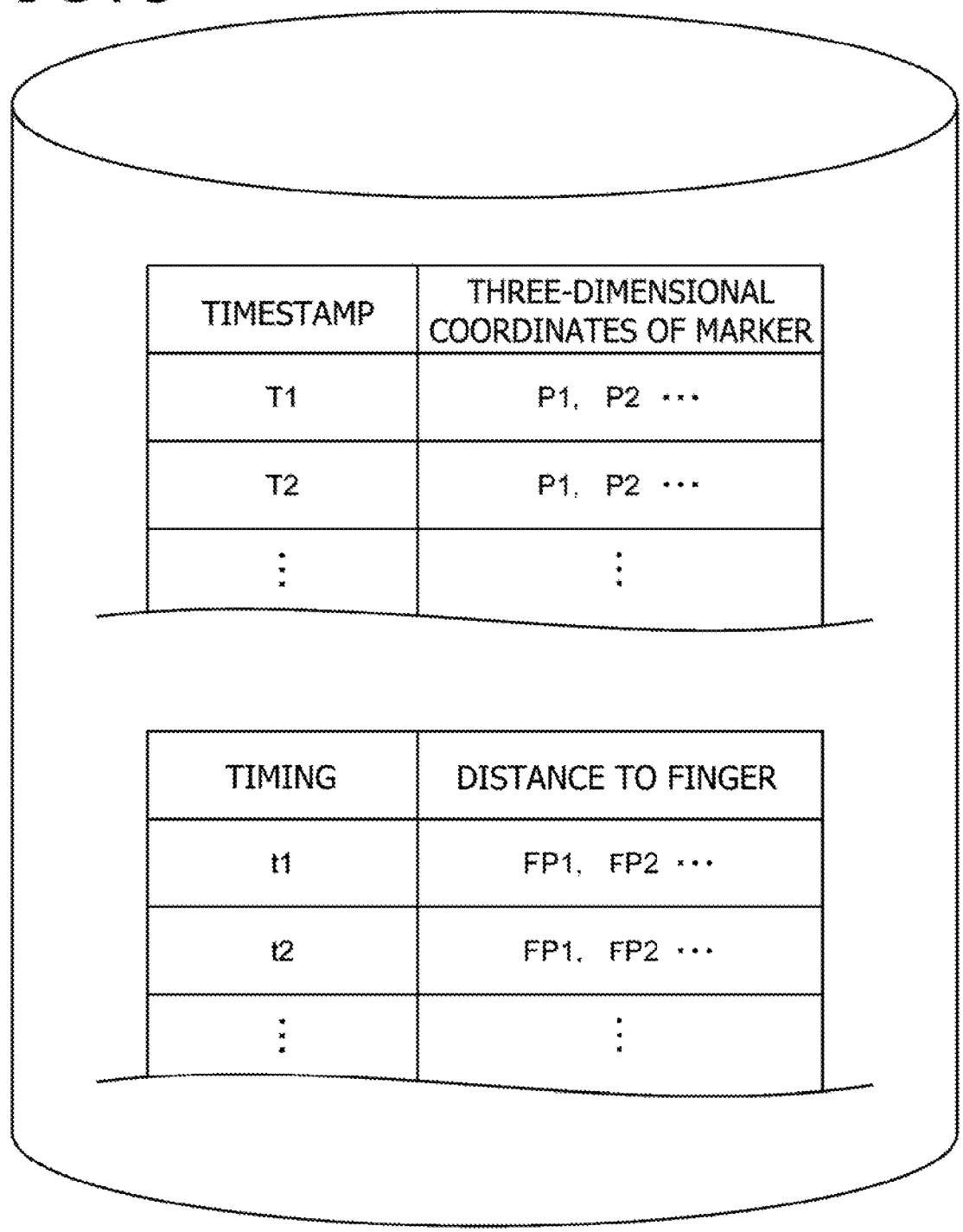
FIG. 5 is an explanatory view depicting an example of information retained by the information processing apparatus according to the embodiment of the present invention.

By this operation of the holding processing unit 43, in regard to the first information, the storage unit 32 stores, at each point of time at which an image of the markers represented by the timestamp information (T1, T2, . . . ) is captured, three-dimensional coordinate information (P1, P2, . . . ) representative of the positions of the markers obtained on the basis of the markers whose images are captured at the point of time in an associated relationship with the point of time as exemplified in FIG. 5.

Meanwhile, in regard to the second information, at each point of time represented by the timing information (t1, t2, . . . ) obtained by the pre-processing unit 42, information, which is accepted at the point of time, of the distance (FP1, FP2, . . . ) between the controller device 200 and the fingertip of each finger of the target person is cumulatively stored into the storage unit 32 in an associated relationship with the point of time.

The extraction processing unit 44 extracts pieces of the first and second information acquired at a common timing from among the first and second information retained in the storage unit 32 as pair information. In particular, the extraction processing unit 44 selects, for example, pieces of information with an interval between timings at which the recorded information is obtained between the first and second information. For example, if the first information is acquired after every ΔT=1/60 second (approximately 17 milliseconds) and the second information is acquired after every Δt=100 milliseconds, then since ΔT<Δt is satisfied, the extraction processing unit 44 selects the second information.

The extraction processing unit 44 reads out information retained in an associated relationship with one piece of timing information from among the selected second information from the storage unit 32. In particular, the extraction processing unit 44 selects one piece of timing information ti (i=1, 2, . . . ) and reads out information (FP1, FP2, . . . ) of the distance to the finger tip of each finger of the target person associated with the selected timing information t1.

The extraction processing unit 44 searches the storage unit 32 for the first information (information with regard to which the interval between timings at which the recorded information is obtained is comparatively short) associated with the information T representative of a timing nearest to time ti represented by the selected timing information.

In the example here, the information of a timing included in the first information is a timestamp, and in regard to the second information, information of a timing corresponding to an elapsed period of time after measurement is started is associated. Therefore, the extraction processing unit 44 of this example of the present embodiment determines that the time point T0 of a timestamp representing time earliest in time is equal to the reference time point t0 acquired by the pre-processing unit 42 when the second information is accepted. Thus, the extraction processing unit 44 finds out, from among the values Tj−T0 (j=1, 2, . . . ) when T0 is subtracted from the time stamps Tj (j=1, 2, . . . ) included in the first information, the timestamp Tj nearest to the time ti represented by the selected timing information.

The extraction processing unit 44 reads out the three-dimensional information (P1, P2, . . . ) representative of the positions of the makers arranged at the portions of the hand of the target person associated with the timestamp Tj found out as described above from the storage unit 32. Further, the extraction processing unit 44 reads out the information of the distance (FP1, FP2, . . . ) between the fingertip of each finger of the target person and the controller device 200 stored in the storage unit 32 in which the selected timing information is stored in an associated relationship with the time ti represented by the selected timing information.

The extraction processing unit 44 uses the three-dimensional coordinate information (P1, P2, . . . ) representative of the positions of the markers read out here as a teacher signal representative of a correct answer and uses the information of the distance (FP1, FP2, . . . ) between the fingertip of each finger of the target person and the controller device 200 as an input signal. Then, the extraction processing unit 44 cumulatively stores the teacher signal and the input signal in a set as learning information into the storage unit 32.

The extraction processing unit 44 repeats the processes described above for each piece of the timing information ti (i=1, 2, . . . ) of the second information to cumulatively store learning information into the storage unit 32.

The control unit 31 in the present embodiment generates learning information in such a manner as described above and uses the learning information cumulatively stored in the storage unit 32 in this manner for a mechanical learning process of a neural network and so forth. Since a suitable one of various widely known methods can be adopted as the method for performing a mechanical learning process on the basis of a set of a teacher signal and an input signal, detailed description of the method is omitted here.

[Operation] The information processing system 1 according to the one example of the present embodiment has the foregoing configuration, and the information processing system 1 according to this example operates in the following manner. A measurement target person makes such action as to paste markers at main positions of its hand (for example, joint positions of the fingers or the like) and arbitrarily moves the hand or the fingers as designated in advance in a state in which the controller device 200 is grasped to move the position of the hand or change the pose.

The measurement device 10 captures an image of the hand of the target person from a plurality of places at every predetermined timing (for example, at every periodical timing after 1/60 second or the like) and recognizes the positions in the three-dimensional space of the plurality of markers pasted to the hand of the target person. Then, the measurement device 10 outputs information of the positions (three-dimensional coordinate information) of the markers together with timestamp information representative of the point of time of the imaging. It is to be noted that the timing of the outputting may be determined such that, after the target person ends all motions, the information is outputted collectively.

Further, the controller device 200 grasped by the hand of the target person repeatedly acquires the information of the distance to each fingertip of the target person measured by the sensors 201 arranged on the surface of the controller device 200 at every predetermined timing (for example, at every periodical timing after 100 milliseconds or the like) and sends out the information to the information processing apparatus 30 every time the controller device 200 acquires the information.

The information processing apparatus 30 accepts, every time the controller device 200 accepts the information (FP1, FP2, . . . ) of the distance between the controller device 200 and the fingertip of each finger of the target person, the information as second information from the controller device 200.

Then, every time the second information is accepted from the controller device 200, the information processing apparatus 30 acquires information of the timing (time information) at which the second information is accepted. The information processing apparatus 30 subtracts reference time t0, which is defined by time information t acquired when the second information is accepted for the first time, from the time information t acquired at the time of the second information accepted for the i-th time to obtain timing information ti (i=1, 2, . . . ; accordingly, for the second information for the first time, t1=0). Then, the information processing apparatus 30 places the timing information ti into a corresponding piece of the second information. The information processing apparatus 30 cumulatively stores the second information in which the timing information is included into the storage unit 32.

On the other hand, the information processing apparatus 30 accepts the information of the positions (three-dimensional coordinate information) of the markers acquired at every predetermined timing by the measurement device 10 during the measurement together with the timestamp information, for example, when the measurement ends. Then, the information processing apparatus 30 cumulatively stores the corresponding timestamp information and the information (P1, P2, . . . ) of the positions of the markers in an associated relationship with each other into the storage unit 32.

In this manner, the storage unit 32 is placed in a state in which, as exemplified in FIG. 5, in regard to the first information, for each point of time at which an image of the markers represented by the timestamp information (T1, T2, . . . ) is captured, three-dimensional coordinate information (P1, P2, . . . ) obtained on the basis of the image of the markers captured at the point of time and representative of the positions of the markers is stored in an associated relationship therewith. In regard to the second information, for each point of time represented by the timing information (t1, t2, . . . ), information (FP1, FP2, . . . ), accepted at the point of time, of the distance between the controller device 200 and the fingertip of each finger of the target person is cumulatively stored in the storage unit 32 in an associated relationship therewith.

The information processing apparatus 30 accepts an instruction to generate learning information for mechanical learning, for example, from a user, and starts processing for generating the learning information. The information processing apparatus 30 performs the following processes with reference to any one of the first and second information. Here, it is sufficient if information in regard to which the distance between timings at which recorded information is obtained is comparatively long (information in regard to which the number of obtained data is smaller) is selected. The following description proceeds assuming that the second information is selected.

Figure 6:
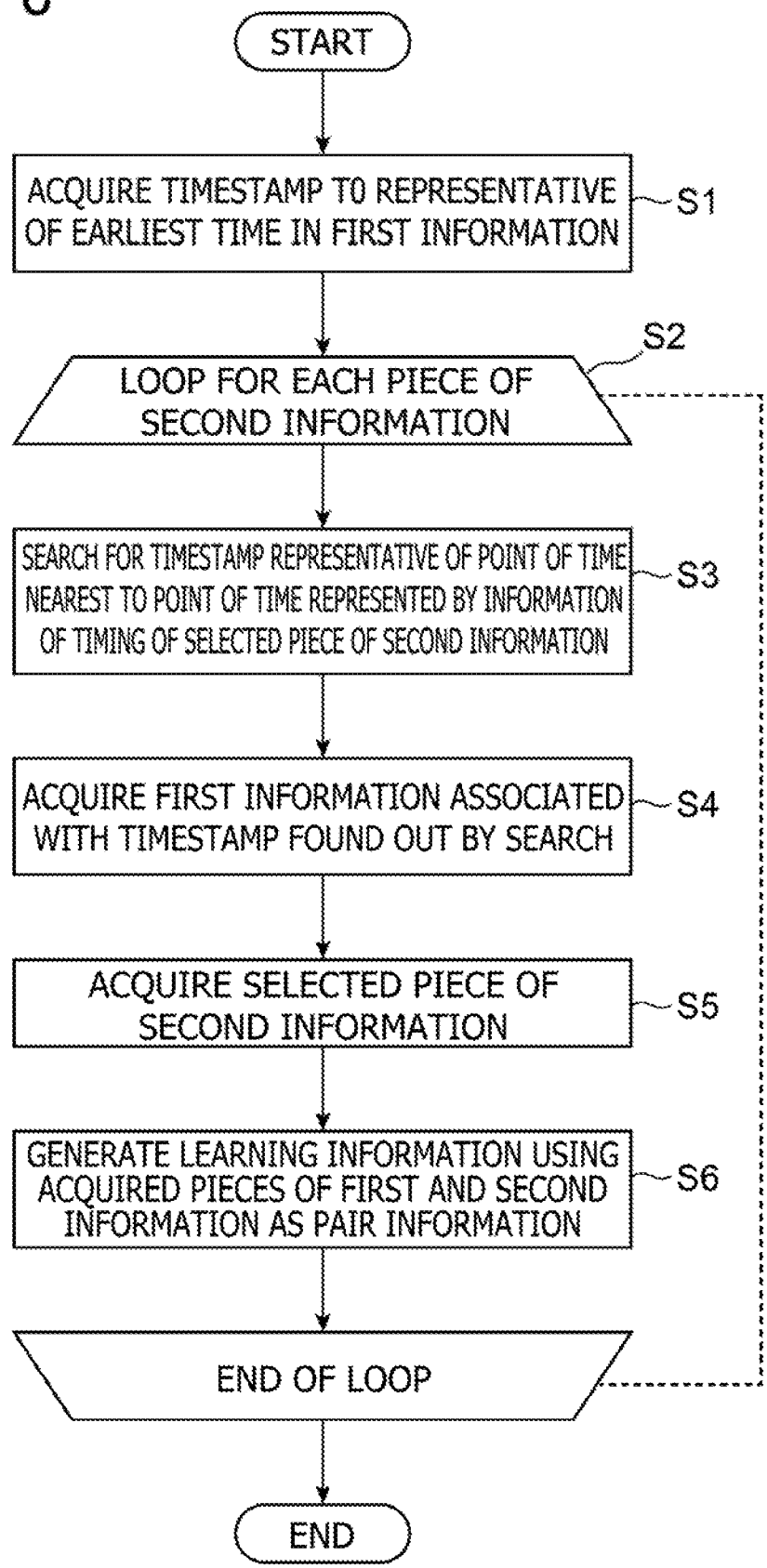
FIG. 6 is a flow chart depicting an example of operation of information processing according to the embodiment of the present invention.

As exemplified in FIG. 6, the information processing apparatus 30 acquires a time point T0 of a timestamp representative of time earliest in time from among the timestamps stored in the storage unit 32 in regard to the first information (S1).

The information processing apparatus 30 successively selects the pieces of the timing information (t1, t2, . . . ) included in the selected second information to repeatedly execute the following processes (S2). In particular, the information processing apparatus 30 searches the storage unit 32 for the first information associated with the information T representative of a timing nearest to the selected timing information ti (information in regard to which the distance between timings at which the recorded information is obtained is comparatively short).

In particular, the information processing apparatus 30 subtracts T0 from the timestamps Tj (j=1, 2, . . . ) stored in the storage unit 32 to obtain values Tj−T0 (j=1, 2, . . . ) and finds out the timestamp Tj of the value Tj−T0 nearest to the timing information ti (S3).

Then, the information processing apparatus 30 reads out the three-dimensional coordinate information (P1, P2, . . . ) representative of the positions of the markers associated with the timestamp Tj found out in the process S3 (S4).

Further, the information processing apparatus 30 reads out the information (FP1, FP2, . . . ) of the distance between the fingertip of each finger of the target person and the controller device 200 associated with the timing information ti selected by the process S2 (S5).

The information processing apparatus 30 uses the three-dimensional coordinate information (P1, P2 . . . ) representative of the positions of the markers read out in the process S4 as a teacher signal representative of a correct answer and uses the information of the distance (FP1, FP2, . . . ) between the fingertip of each finger of the target person and the controller device 200 read out in the process S5 as an input signal. Then, the information processing apparatus 30 cumulatively stores the signals in a set as learning information into the storage unit 32 (S6).

The information processing apparatus 30 repeatedly executes the processes described above beginning with the process S2 until no piece of timing information (t1, t2, . . . ) that has not been selected as yet remains anymore. Consequently, the storage unit 32 is placed into a state in which a set of a teacher signal and an input signal (pair information) for each piece of timing information (t1, t2, . . . ) representative of a timing at which the second information is obtained is retained.

In this manner, according to the present embodiment, the necessity for combination of a teacher signal and an input signal by manual work is eliminated, and data for mechanical learning for estimating information of a position, a pose or the like of a hand of the target person can be generated efficiently.

[Example in which the content of information is referred to] In the description above, in order to find out first and second information acquired at a common timing, information of a timing representative of a point of time at which the second information is acquired is associated with the second information. Then, an example is described in which, presupposing that a start point of time of measurement is common to the measurement device 10 and the estimation device 20, first information associated with a timestamp representative of a point of time nearest to a point of time represented by the associated timing information is searched for.

However, in the case where there is a difference between a measurement start point of time of the measurement device 10 and a point of time at which information is outputted for the first time from the estimation device 20, an error occurs with the information for learning. Therefore, in one example of the present embodiment, a user who is to generate learning information may visually confirm first information and second information and designate a point of time at which both of the information designate a same position or pose of the hand to the information processing apparatus 30.

For example, in the case where information at a timestamp Tk of the first information and a piece of information in the timing information tm from among the second information represent a same position or pose of the hand, the pieces of information are designated. Consequently, the information processing apparatus 30 acquires the difference between $\Delta Tk=Tk-T0$ (here, T0 is information of a timestamp representative of time earliest in time from among the timestamps stored in the storage unit 32 in regard to the first information described hereinabove) and tm, that is, $\Delta=\Delta Tk-tm$, as correction information. Then, in the process S3 described above, the information processing apparatus 30 calculates values $Tj-T0$ ($j=, 1, 2, \ldots$) by subtracting T0 from the timestamps Tj ($j=1, 2, \ldots$) stored in the storage unit 32 and finds out a timestamp Tj having a value $Tj-T0$ nearest to a value obtained by adding the correction information $\Delta$ to the timing information ti, that is, to $ti+\Delta$.

Further, although it is described here that the user visually searches for a point of time at which the first and second information represents a same position or pose of the hand, this search may be mechanically performed (without any artificial processing) by the information processing apparatus 30.

In this case, for example, the target person is caused to initially perform a motion of holding a hand (establishing a state in which the target person touches at the fingertips thereof with the controller device 200) and a motion of opening the hand (establishing a state in which the fingertips are spaced from the controller device 200 as far as possible). Then, the information processing apparatus 30 obtains information Tmin of a timestamp associated with a piece of the first information, which is located before a time point Tf at which, when the recorded first information is checked in the ascending order of the timestamp, information representing that the target person is in a state in which the hand is open (for example, information with which the points of three-dimensional coordinates of the markers pasted to the individual fingers are located substantially linearly) is recorded for the first time and which represents that the target person is in a state in which the hand is held (for example, a piece of the first information when the volume of a minimum projecting hull including a point of the three-dimensional coordinates of each marker is smallest).

Further, the information processing apparatus 30 checks the recorded second information in a recording order (in the ascending order of time represented by the information of the associated timings) to obtain information tmin of the timing associated with the information representing that the target person is in a state in which the hand is held and found out for the first time in the check (for example, the second information in which the distance to each fingertip is in the minimum).

Then, the information processing apparatus 30 acquires the difference between $\Delta Tk=Tmin-T0$ (here, information of the timestamp representative of time earliest in time from among the timestamps stored in the storage unit 32 in regard to the first information described hereinabove) and tmin, that is, $\Delta=\Delta Tk-tmin$, as correction information. Then, in the process S3 described above, the information processing apparatus 30 subtracts T0 from the timestamps Tj ($j=1, 2, \ldots$) stored in the storage unit 32 to obtain values $Tj-T0$ ($j=1, 2, \ldots$ and finds out a timestamp Tj having a value $Tj-T0$ nearest to the value obtained by adding the correction information $\Delta$ to the timing information ti, that is, $ti+\Delta$.

Consequently, determining a timing at which the position or the pose of the hand of the target person represented by the retained first information is determined to be substantially same as the position or the pose of the hand of the target person represented by the retained second information as a common timing, pieces of the first and second information acquired at the common timing can be extracted as pair information.

[Example in which a marker is pasted also to an estimation device] Further, it is described in the foregoing description that the markers detected by the measurement device 10 that is the first information acquisition apparatus are pasted to portions of a hand of a target person, in an example of the present embodiment, the markers may be applied also to the controller device 200 that is the second information acquisition apparatus.

In this case, the measurement device 10 acquires information of the position, posture and so forth of the controller device 200 as the estimation device 20 together with information relating to a position or a pose of the hand of the target person. Then, the information processing apparatus 30 records first information including the information of the position and the posture of the controller device 200 together with the information relating to the position and the pose of the hand of the target person. Further, the information processing apparatus 30 extracts a teacher signal from the record of the first information and extracts the second information (input signal) acquired by the controller device 200 at a timing common to the timing at which the extracted teacher signal is obtained, and then outputs the teacher signal and the input signal as pair information.

In this example of the present embodiment, a mechanical learning process for estimating not only the position or the pose of a hand of a player who grasps the controller device 200 but also information of the position or the posture of the grasped controller device 200 becomes possible.

[Example in which the estimation device is a camera]
Further, in the present embodiment, the estimation device 20 may not necessarily be the controller device 200 that is grasped by a hand of a target person. For example, in a certain example of the present embodiment, the estimation device 20 may be a depth camera including a pair of cameras arranged at a predetermined one position for a player (target person) such that the cameras are directed toward the target person.

In this case, depending upon the situation of the posture or the pose of a hand of the target person, the depth camera that is the estimation device 20 cannot necessarily view all fingers of the target person (for example, in such a case where the back of a hand of a player enters a place from the depth camera to the fingers). However, the measurement device 10 can acquire position information of all markers pasted to the joints and so forth of all the fingers of the target person.

In this example, the second information includes image data of two images captured by the pair of cameras included in the depth cameras.

Further, in this example, every time the acceptance unit 41 accepts second information, the pre-processing unit 42 acquires information of the timing (time information) at which the second information is accepted. Further, the pre-processing unit 42 subtracts reference time t0, which is defined by time information t acquired when second information is accepted for the first time after processing is started, from the time information t acquired at the time of the second information accepted for the i-th time to obtain timing information ti (i=1, 2, . . . ; accordingly, for the second information for the first time, t1=0). Then, the pre-processing unit 42 places the timing information ti into a corresponding piece of the second information and outputs the piece of the second information to the holding processing unit 43.

Furthermore, in this example of the present embodiment, the pre-processing unit 42 may perform a process for removing an image of markers for the recognition by the measurement device 10, which is included in image data that is second information. In particular, since the markers are colored, for example, in a color determined in advance, the pre-processing unit 42 performs a process for extracting the colored portions of the markers included in the image data that is the second information and filling the portions with a color surrounding the portions. Since a process widely known as an image process of photo retouching or the like can be used for the process mentioned, detailed description is omitted herein.

If the pre-process is performed in this manner, the input signal for learning information is placed into a state in which an image that includes no marker is provided. Usually, in a scene in which a neural network or the like learned actually using learning information is utilized, image data captured by the depth camera does not include any marker. Therefore, since the input signal that is learning information is made proximate to the actually utilized image data, it is expected that more precise estimation is performed.

REFERENCE SIGNS LIST

1 Information processing system, 10 Measurement device, 20 Estimation device, 30 Information processing apparatus, 31 Control unit, 32 Storage unit, 33 Operation unit, 34 Display controlling unit, 35 Inputting and outputting unit, 41 Acceptance unit, 42 Pre-processing unit, 43 Holding processing unit, 44 Extraction processing unit, 200 Controller device, 201 Sensor.

The invention claimed is:

1. An information processing apparatus connected to a first information acquisition apparatus that acquires first information relating to at least one of a position or a pose of a hand of a target person and a second information acquisition apparatus that acquires second information relating to at least one of the position or the pose of the hand of the target person and different from the first information acquired by the first information acquisition apparatus, the information processing apparatus comprising:
   an acceptance unit for accepting the first information and the second information from the first and second information acquisition apparatuses, respectively;
   a retention unit for retaining the accepted first and second information in an associated relationship with information of timings at which the first and second information acquisition apparatuses acquire the first and second information, respectively; and
   an extraction unit for extracting pieces of the first and second information acquired at a common timing from the retained first and second information as pair information, wherein
   the extracted pair information is provided for a learning process of mechanical learning using the first and second information included in the pair information as a teacher signal and an input signal, respectively, and
   when it is known that, with regard to a particular position or pose of the hand of the target person, first information pieces relating to the particular position or pose and the second information pieces relating to the particular position or pose are not acquired at a common timing, a correction is applied to nevertheless extract the pieces as pair information.

2. The information processing apparatus according to claim 1, wherein the extraction unit extracts, on a basis of a content of the retained first and second information, pieces of the first and second information acquired at the common timing as the pair information.

3. The information processing apparatus according to claim 2, wherein the extraction unit determines a timing at which the position or the pose of the hand of the target person represented by the retained first information is substantially same as the position or the pose of the hand of the target person represented by the retained second information as the common timing and extracts the pieces of the first and second information acquired at the common timing as the pair information.

4. An information processing system comprising:
   a first information acquisition apparatus configured to acquire first information relating to at least one of a position or a pose of a hand of a target person;
   a second information acquisition apparatus configured to acquire second information relating to at least one of the position or the pose of the hand of the target person and different from the first information acquired by the first information acquisition apparatus; and
   an information processing apparatus; wherein
   the information processing apparatus includes
   an acceptance unit for accepting the first information and the second information from the first and second information acquisition apparatuses, respectively,
   a retention unit for retaining the accepted first and second information in an associated relationship with information of timings at which the first and second information acquisition apparatuses acquire the first and second information, respectively, and an extraction unit for extracting pieces of the first and second information acquired at a common timing from the retained first and second information as pair information; and the extracted pair information is provided for a learning process of mechanical learning using the first and second information included in the pair information as a teacher signal and an input signal, respectively, and when it is known that, with regard to a particular position or pose of the hand of the target person, first information pieces relating to the particular position or pose and the second information pieces relating to the particular position or pose are not acquired at a common timing, a correction is applied to nevertheless extract the pieces as pair information.

5. The information processing system according to claim 4, wherein the first information acquisition apparatus detects positions of a plurality of markers arranged on the hand of the target person and acquires the first information relating to at least one of the position or the pose of the hand of the target person on a basis of the detected positions of the markers, the second information acquisition apparatus includes a device to be grasped by the hand of the target person and acquires the second information relating to at least one of the position or the pose of the hand of the target person on a basis of information detected by the device, and the markers to be detected by the first information acquisition apparatus are arranged also on the device of the second information acquisition apparatus, and the first information acquisition apparatus acquires information relating to a position or a posture of the device of the second information acquisition apparatus together with the first information relating to at least one of the position or the pose of the hand of the target person and outputs the acquired information to the information processing apparatus.

6. A method in which an information processing apparatus is used that is connected to a first information acquisition apparatus that acquires first information relating to at least one of a position or a pose of a hand of a target person and a second information acquisition apparatus that acquires second information relating to at least one of the position or the pose of the hand of the target person and different from the first information acquired by the first information acquisition apparatus, the information processing apparatus carrying out a method, comprising:

accepting the first information and the second information from the first and second information acquisition apparatuses, respectively;

retaining the accepted first and second information in an associated relationship with information of timings at which the first and second information acquisition apparatuses acquire the first and second information, respectively; and extracting pieces of the first and second information acquired at a common timing from the retained first and second information as pair information, wherein the extracted pair information is provided for a learning process of mechanical learning using the first and second information included in the pair information as a teacher signal and an input signal, respectively, and when it is known that, with regard to a particular position or pose of the hand of the target person, first information pieces relating to the particular position or pose and the second information pieces relating to the particular position or pose are not acquired at a common timing, a correction is applied to nevertheless extract the pieces as pair information.

7. A non-transitory, computer readable storage medium containing a computer program, which when executed by an information processing apparatus that is connected to a first information acquisition apparatus that acquires first information relating to at least one of a position or a pose of a hand of a target person and a second information acquisition apparatus that acquires second information relating to at least one of the position or the pose of the hand of the target person and different from the first information acquired by the first information acquisition apparatus, causes the information processing apparatus to carry out actions, comprising:

accepting the first information and the second information from the first and second information acquisition apparatuses, respectively;

retaining the accepted first and second information in an associated relationship with information of timings at which the first and second information acquisition apparatuses acquire the first and second information, respectively; and extracting pieces of the first and second information acquired at a common timing from the retained first and second information as pair information, wherein when it is known that, with regard to a particular position or pose of the hand of the target person, first information pieces relating to the particular position or pose and the second information pieces relating to the particular position or pose are not acquired at a common timing, a correction is applied to nevertheless extract the pieces as pair information.

* * * * *